United States Patent [19]

Itoh et al.

[11] Patent Number: 5,280,464
[45] Date of Patent: Jan. 18, 1994

[54] OPTICAL DISK APPARATUS HAVING A FOCUSING ERROR CORRECTING SYSTEM

[75] Inventors: Tsuyoshi Itoh; Isao Okuda; Toshiyuki Kase; Hiroshi Nishikawa; Ryota Ogawa; Masahiro Oono; Koichi Maruyama; Makoto Iki, all of Tokyo, Japan

[73] Assignee: Asahi Kogaku Kogyo Kabushiki Kaisha, Tokyo, Japan

[21] Appl. No.: 741,620

[22] Filed: Aug. 7, 1991

[30] Foreign Application Priority Data

Aug. 7, 1990 [JP] Japan ................... 2-208633

[51] Int. Cl.⁵ .............................................. G11B 7/00
[52] U.S. Cl. .................................................. 369/44.23
[58] Field of Search ............... 369/44.23, 44.24, 44.32, 369/116, 112, 122

[56] References Cited
U.S. PATENT DOCUMENTS

| | | |
|---|---|---|
| 4,643,538 | 2/1987 | Wilson ........................ 369/122 |
| 4,709,139 | 11/1987 | Nakamura et al. ......... 369/44.23 |
| 4,805,992 | 2/1989 | Maeda ........................ 369/44.23 |
| 4,807,212 | 2/1989 | Kaneda ....................... 369/44.23 |
| 4,812,638 | 3/1989 | Ogata et al. . |
| 4,822,151 | 4/1989 | Tatsuno ...................... 369/121 |
| 5,121,378 | 6/1992 | Hirose et al. ............... 369/44.12 |

FOREIGN PATENT DOCUMENTS

61-109015  5/1986  Japan .

*Primary Examiner*—Donald E. McElheny, Jr.
*Attorney, Agent, or Firm*—Sandler, Greenblum and Bernstein

[57] ABSTRACT

An optical system of an optical disk apparatus having plural optical elements characterized in that the optical element having aberration which can counterbalance the wave front aberration of the whole optical system is disposed, or a direction of aberration of each existing optical element is adjusted in order to correct the wave front aberration.

4 Claims, 7 Drawing Sheets

OPTICAL DISK APPARATUS HAVING A FOCUSING ERROR CORRECTING SYSTEM

BACKGROUND OF THE INVENTION

1. Field of the Invention

This invention relates to an optical disk apparatus that detects a focus error signal by the astigmatism method.

2. Description of the Prior Art

In a known optical disk apparatus, laser light emitted from a laser light source is converged onto an optical disk serving as a recording medium. Reflected light from the optical disk is received by a photodetector to produce electric signals corresponding to recorded information and/or error information. In order to maintain accurate recording and/or reproducing the laser light must be converged into a light spot the diameter of which is as small as a diffracting limit on the optical disk; accurate tracking of the beam is also required to keep the spot on the center of a track of the optical disk.

The optical disk apparatus has a detecting system to detect a focus error signal and a track error signal and a driving system to drive an objective lens along an optical axis direction and along a radial direction of the optical disk.

There are several methods to detect the focusing error signal. In general, an astigmatism method is used. The apparatus using the astigmatism method has a cylindrical lens placed in front of the photodetector. The light beam introduced on the photodetector will be circular only when the focus is correct, otherwise it becomes an ellipse where the aspect ratio of which changes as a function of the state of focus.

The photodetector is split into four photodetecting areas, and the focus error signal is generated from the difference between the outputs of the photodetecting areas.

However, when the focus error signal is detected by the above-mentioned astigmatism method, if the light beam has a wave front aberration, noise occurs in the focus error signal when the spot moves across a track.

The noise occurs as a result of a non-uniform intensity distribution, due to diffraction of the spot, when the light spot has a wave front aberration. In this specification, this noise is termed as F/T(focus/track) cross talk.

When the F/T cross talk occurs, the focus error signal indicates the objective lens being out of focus, even when the lens is in focus. Since the objective lens is driven along an optical axis direction, the objective lens is unstable whenever the light spot moves across a track. Therefore, the focus error signal is confused and movement of the light spot becomes inaccurate.

SUMMARY OF THE INVENTION

The present invention has been accomplished in view of the above discussed problem. It is therefore the object of the present invention to provide an optical system of an optical disk apparatus that is capable of reducing the F/T cross talk that occurs when the spot moves across a track.

In an optical system of an magneto-optic disk apparatus according to the present invention, the optical element has an aberration which can counterbalance the wave front aberration of the whole optical system is provided, or a direction of aberration of each existing optical element is adjusted in order to correct the wave front aberration.

DETAILED DESCRIPTION OF THE EMBODIMENTS

The embodiment of the present invention will now be described hereinafter with reference to the drawings.

FIRST EMBODIMENT

Figure 1:
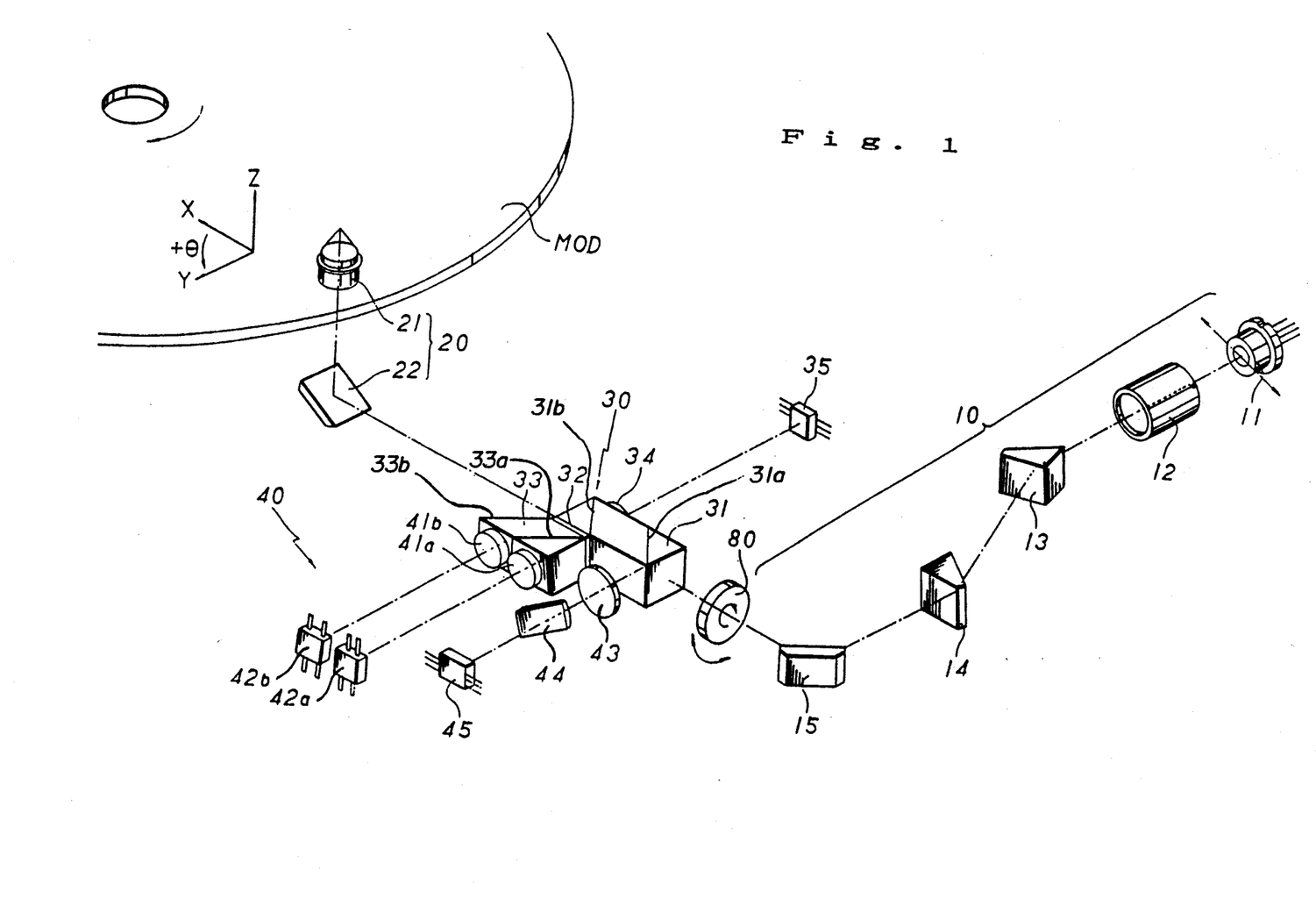
FIG. 1 is a perspective view showing the arrangement of optical elements of the first embodiment according to the present invention.

FIG. 1 shows the first embodiment of the present invention applied to an optical system of a magneto-optic disk apparatus. In this embodiment, an optical element having wave front aberration that can counterbalance the wave front aberration of the whole optical system, except the optical element, is disposed to prevent the occurrence of the F/T cross talk.

As shown in FIG. 1, an optical system of the apparatus is provided with light source 10, objective optical system 20, prism block 30 and signal detecting optical system 40. The light source 10 is composed of semiconductor laser 11 for generating a divergent light beam, collimator lens 12 for collimating the divergent light beam, anamorphic prisms 13, 14 for shaping the sectional shape of the light beam, and mirror 15. The light source 10 generates a parallel beam having a circular sectional shape.

Figure 2:
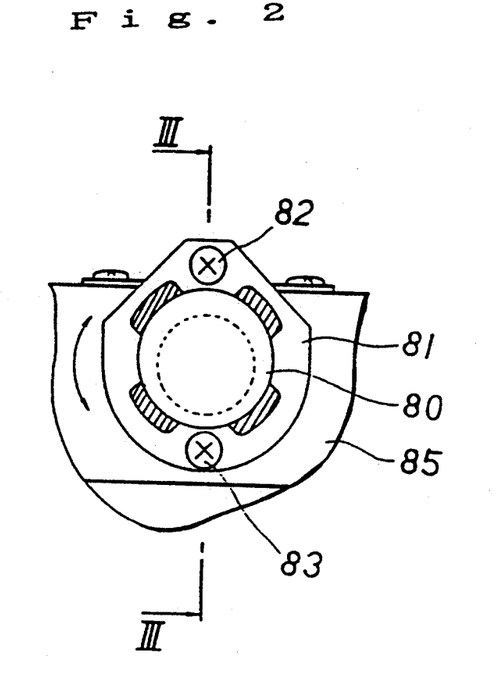
FIG. 2 is a front view showing assembly construction of an astigmatism generating element.
Figure 3:
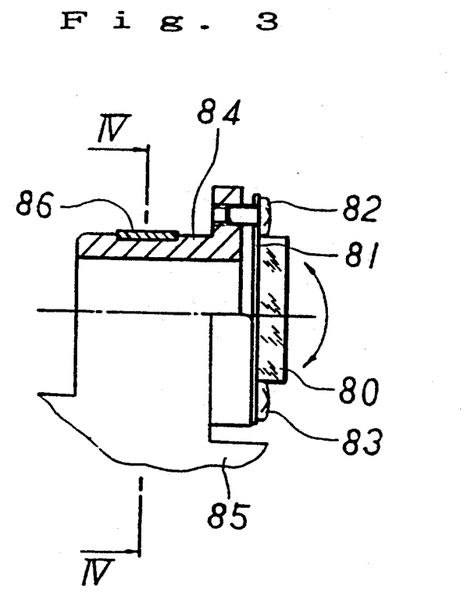
FIG. 3 is a sectional view of FIG. 2 along line III—III.
Figure 4:
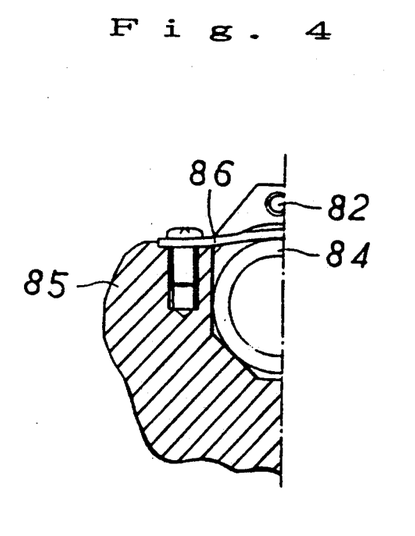
FIG. 4 is a sectional view of FIG. 3 along line IV—IV.

Astigmatism generating element 80 is disposed between the mirror 15 and the prism block 30. The element 80 is attached to plate spring 81, as shown in FIGS. 2 to 4, the plate spring 81 being fixed to the holder 84 with two screws 82 and 83. The holder 84 has a cylindrical shaft which is arranged in a groove of base 85 on which each optical element is fixed. Pressure plate 86 presses the holder 84 down to fix it to the base 85.

The screw 82 adjusts strain of the astigmatism generating element 80. If the screw 82 is tightened or loosened, the strain of the plate spring 81 and the astigmatism generating element 80 change, and the wave front aberration that is generated by the element 80 changes.

If the pressure plate 86 is loosened, the holder 84 can be pivoted about an optical axis, and the direction of the astigmatism of the element 80 can be changed. Since the curvature and/or the pivot angle of the element 80 are adjusted, the wave front aberration of the whole optical system can be changed. The double headed arrows in FIGS. 2 and 3 represent the directions of rotation of the holder and adjustment of the mirror, respectively.

The objective optical system 20 includes a mirror 22 and an objective lens 21 for converging the beam onto a recording surface of magneto-optic disk MOD. The objective lens 21 and the mirror 22 are disposed within a head (not shown) that slides in the radial direction of the magneto-optic disk MOD. Also, the objective lens 21 is mounted on an actuator that is disposed within the head and can be finely moved in the optical axis direction and in the radial direction.

The prism block 30 comprises, as shown in FIG. 1, first block 31 having two half mirror surfaces 31a and 31b, halfwave plate 32 and second block 33 that are attached to one another. The second block 33 has polarizing splitting surface 33a and total reflecting surface 33b.

Part of light beam emitted from the light source 10 is reflected by the second half mirror surface 31b and condensed by condenser lens 34 on photodetector 35 of an auto power control system for the semiconductor laser 11.

On the other hand, reflected light beam from the magneto-optical disk MOD is reflected by the second half mirror surface 31b, and is rotated in its polarization direction by 45° through the halfwave plate 32. A p-polarized component passes through the polarizing splitting surface 33a and condenser lens 41a to condense the beam on first photodetector 42a. An s-polarized component is reflected by both of the surfaces 33a and 33b; it condenses the beam on second photodetector 42b through condenser lens 41b.

A polarizing direction of the beam reflected by the magneto-optic disk MOD rotates due to the Kerr effect according to magnetizing direction of the spot point on the disk MOD. Since the polarizing direction is rotated by 45° by the halfwave plate 32 and each polarizing component is detected by the independent photodetector, it is possible to detect the recorded signal being based on the difference between the output signals from the photodetectors 42a and 42b.

Part of reflected light from the magneto-optic disk passes through the second half mirror surface 31b and is reflected by the first half mirror surface 31a. The beam passes through condenser lens 43 and cylindrical lens 44 to generate astigmatism, and the beam is introduced to error detecting photodetector 45.

The photodetector 45 has four photodetecting areas which are arranged in a pattern such as a grill pattern. By subtracting the resulting signals, which are obtained by adding the outputs of diagonally opposite areas, the focus error signal can be detected.

Wave front aberration, for example astigmatism, in an optical system of an optical disk apparatus can be typically explained as a difference of wave front curvature on the rectangular coordinates (0°, 90°) formed by the X and Y axes, and that of the rectangular coordinate (45°, −45°), wherein an X-axis denotes a radial direction of the disk and Y-axis denotes a tangential direction. In this specification, the difference on the coordinates (0°, 90°) is defined as AS1, and that of the coordinates (45°, −45°) is defined as AS2.

As shown in FIG. 1, when an anamorphic optical system is used to correct the shape of the beam from the semiconductor laser, the AS1 can be corrected by adjusting the distance between the semiconductor laser 11 and the collimator lens 12 along the optical axis.

However, the AS2 can not be corrected by the above adjustment and it remain as aberration. If the light beam includes the AS2, the intensity distribution of the beam on the photodetector changes abnormally due to diffraction. On the basis of the abnormal distribution, the focus error signal FE can not maintain the zero level when the spot jumps a track, and the F/T cross talk is generated.

Now, the generation of the wave front aberration and the effect of the astigmatism generating element 80 will be described.

Figure 5:
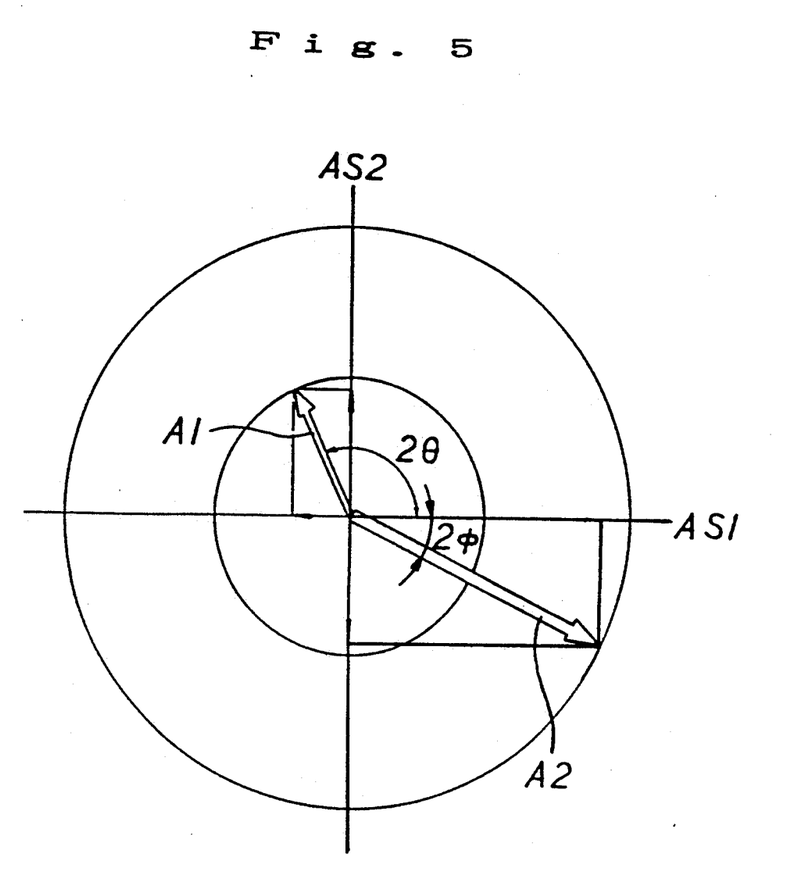
FIG. 5 is a coordinate (or graph) showing wave front aberration.

FIG. 5 shows a relation between the AS1 and the AS2 using vectors, each axis indicating the amount of the AS1 and the AS2. Character A1 shows wave front aberration of the whole optical system except the astigmatism generating element 80. A1 makes an angle of $2\theta$ with the AS1 axis. Character A2 shows wave front aberration of the astigmatism generating element 80. A2 makes an angle of $2\phi$ with the AS1 axis. If these wave front aberrations are divided into an AS1 component and an AS2 component, amount of each component is given according to the following equations.

$$AS1 = A1 \cdot \cos 2\theta + A2 \cdot \cos 2\phi$$

$$AS2 = A1 \cdot \sin 2\theta + A2 \cdot \sin 2\phi$$

A way to cancel the AS2 is to add an optical element having wave front aberration that can counterbalance the AS2 component of the whole optical system, as in the above embodiment. The other way is to adjust a direction of an existing optical element so that the AS2 is canceled.

The abnormal distribution region due to the AS1 spreads over neighboring photodetecting areas of the photodetector when the spot moves across a track. Since the effect of the abnormality is counterbalanced with respect to each other by an operation, (i.e., the calculation for detecting the focus error signal), the AS1 does not have an influence on the focus error signal. It is not always necessary to correct the AS1 in order to reduce the F/T cross talk. And also, if the aberration of the AS2 can be directed toward the AS1, (i.e., by changing the orientation of an optical element), instead of correcting the wave front aberration perfectly, at least the F/T cross talk can be removed.

SECOND EMBODIMENT

Figure 6:
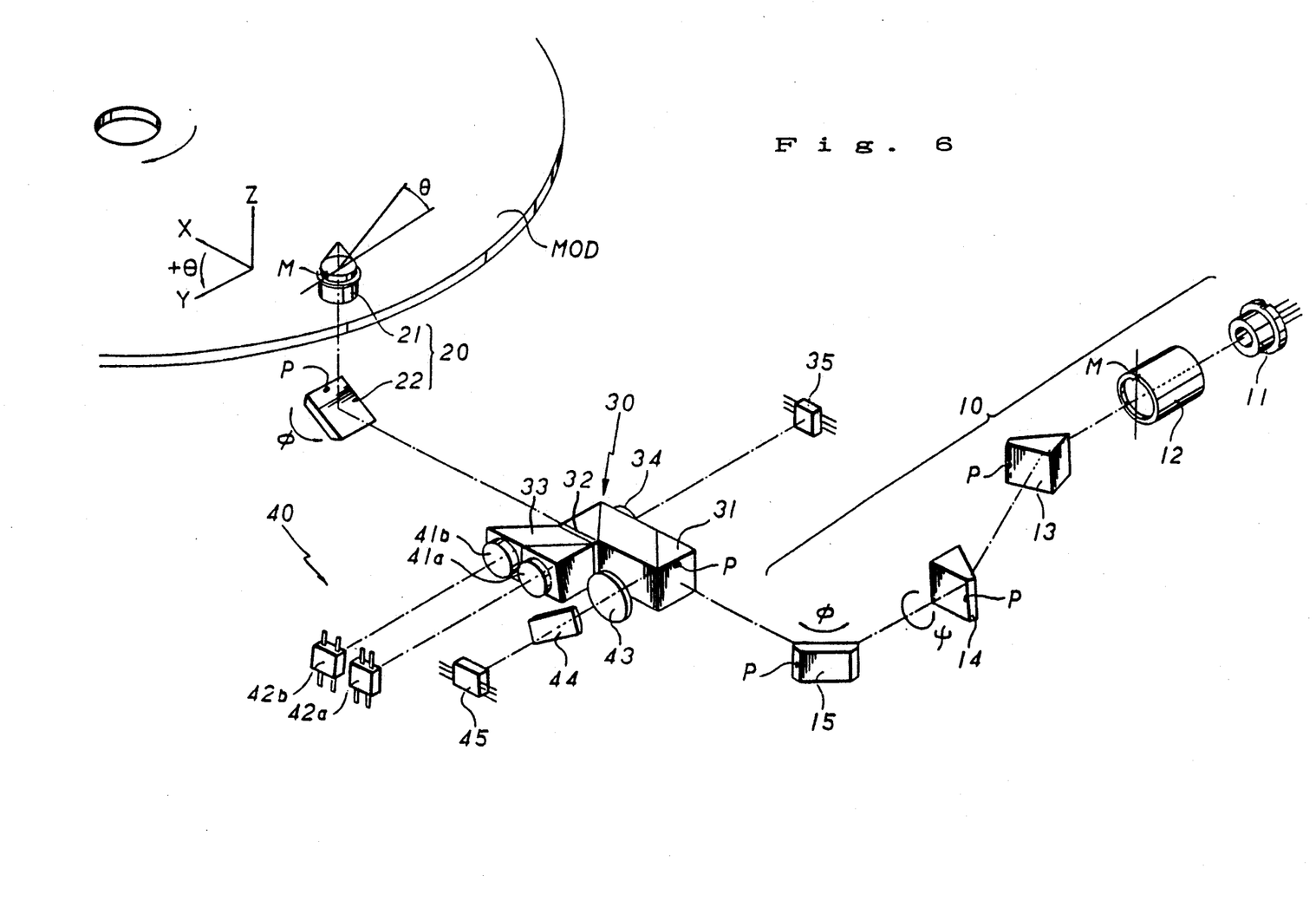
FIG. 6 is a perspective view showing the arrangement of optical elements of the second embodiment according to the present invention.

FIG. 6 shows the second embodiment of the present invention.

In the second embodiment, the wave front aberration on the optical disk is corrected by arranging or adjusting an existing optical element.

As shown in FIG. 6, each optical element disposed in the optical system is marked with P which indicates a direction of astigmatism. These elements are disposed in such a manner that the directions of astigmatisms are orthogonal to each other; thus the astigmatism and wave front aberration of the whole optical system becomes abated. In this embodiment, the same elements as the first embodiment is denoted as the same reference characters.

Figure 7:
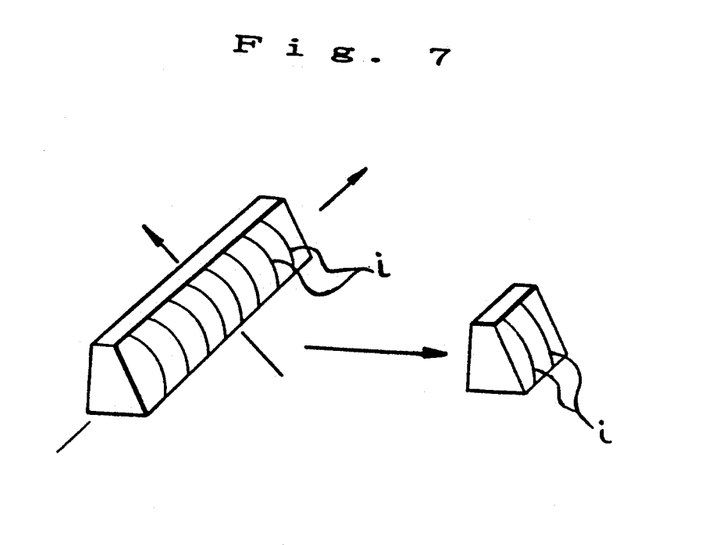
FIG. 7 shows a shape of a prism block during polishing.

FIG. 7 shows a prism block which consists of small prisms during polishing and upon which interference fringes "i" are indicated. In general, the small prisms are connected with one another as shown in FIG. 7, when the prisms are polished, and they are separated after polishing. If the prisms are polished by this method, the surface in a short edge direction is apt to become concave. The prisms therefore generate astigmatism. Since separated prisms have the same aberration, in this example, prisms are marked with P in one side of the short edge direction.

Since the prisms 13 and 14 are arranged in such a manner that the astigmatism directions which is indicated with marks P are orthogonal to each other as shown in FIG. 6, it is possible to counterbalance the astigmatisms, and wave front aberration of the whole system can be reduced.

Figure 8:
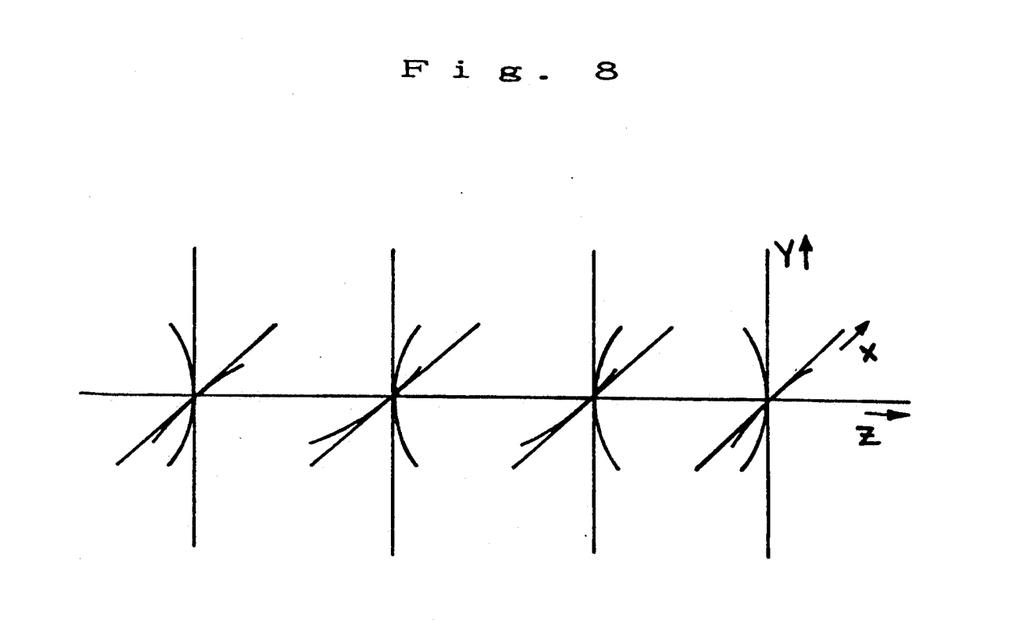
FIG. 8 shows wave front to which each optical element affect.

FIG. 8 shows wave front aberration which is generated with an optical element such as a prism wherein Z indicates the light axis direction, X indicates the direction corresponding to the radial direction of the disk and Y indicates the direction corresponding to the tangential direction of the disk. Since elements having specific wave front aberration are arranged in such a manner that counter wave front aberrations are generated, wave front aberration of each element can be counterbalanced.

Next, wave front aberration owing to shapes of the mirrors 15 and 22 will be described.

As shown in FIG. 6, a direction of strain of each mirror due to transformation in polishing is measured, each mirror is marked with P which indicate the directions of the largest astigmatism. Since the mirrors are disposed so that the directions are orthogonal to each other, wave front aberration due to the strain of the mirror can be reduced.

Figure 9:
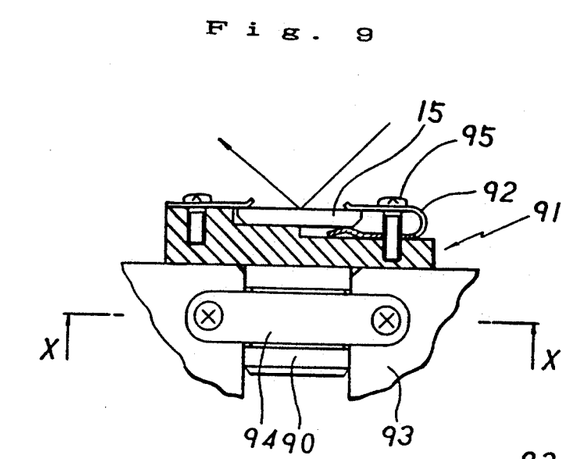
FIG. 9 is a sectional view of an assembly of a mirror.
Figure 10:
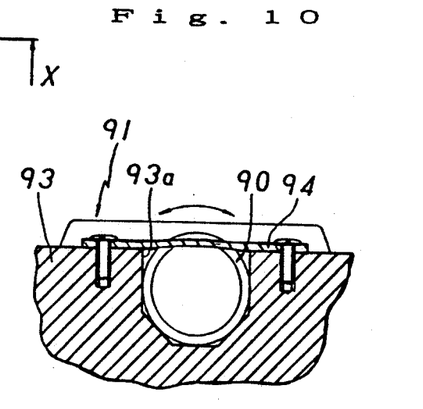
FIG. 10 is a sectional view of FIG. 9 along line X—X.

FIGS. 9 and 10 show a holding mechanism that holds a mirror. The holding mechanism makes the shape of the mirror change in order to change wave front aberration generated with the mirror.

The mirror 15 is held with holder 91 by clip spring 92, which is fixed with screw 95. Shaft 90 of the holder 91 is disposed in groove 93a of base 93, as shown in FIG. 10. The shaft 90 is fixed with plate spring 94 screwed on the base 93 from upper side in the figure.

The screw 95 is a strain adjusting screw. When the screw 95 is driven, stress to the mirror 15 changes and the mirror 15 is transformed. The direction of the strain can be changed by rotating the holder 91. The double headed arrow represents the directions of rotation of the holder.

Figure 11:
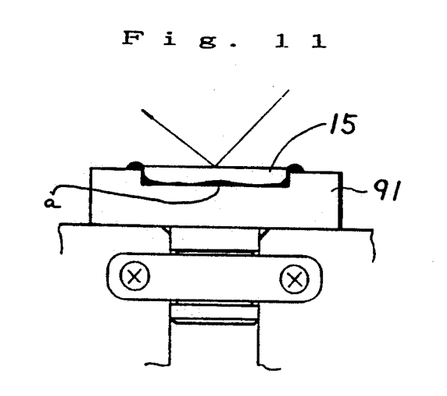
FIG. 11 shows a mirror fixed to the holder by adhesive.

FIG. 11 shows an example where the mirror 15 is fixed to the holder 91 with adhesive. In this example, since thickness of adhesive "a" changes over the area of contact between the mirror and holder, the mirror 15 strains and the aberration generated.

Figure 12:
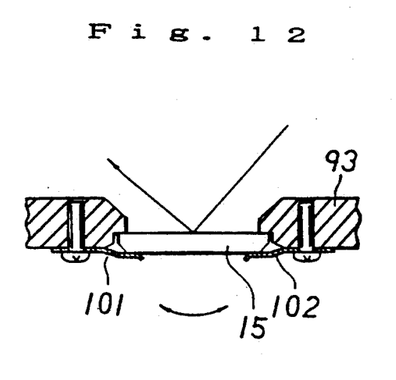
FIGS. 12 to 14 are views of other assemblies of a mirror.
Figure 13:
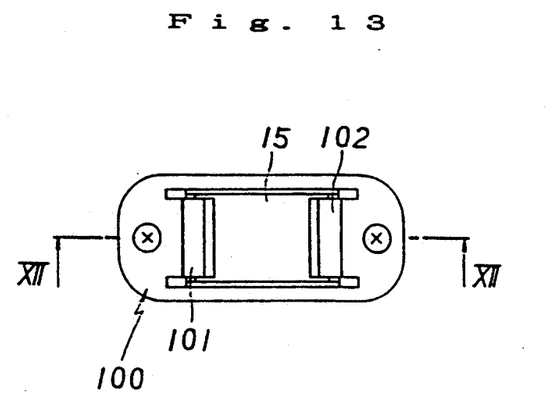

FIGS. 12 and 13 show a construction to hold a mirror with a spring from a back side of the mirror. The plate spring 100 having pressure portions 101 and 102 is fixed on the base 93 with screws. The mirror is abutted to the base 93 by the pressure portions 101 and 102.

Figure 14:
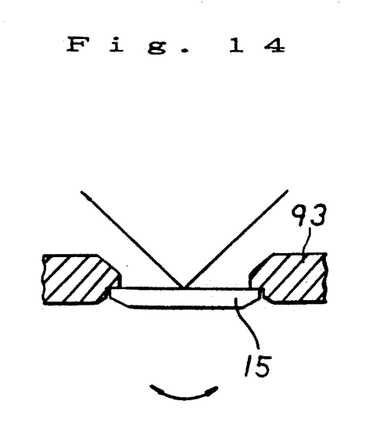

FIG. 14 shows a construction for attaching the mirror 15 to the base 93 from back side of the mirror. The mirror 15 is held from rear side, it is strained by stress from a direction opposite the stress generated in case of a front fixed mirror, and it thus generates wave front aberration opposite that generated by the front fixed mirror. Since both of the front fixing mirror and back fixing mirror are used in the optical system, it is possible to avoid the accumulation of aberrations, and wave front aberration of the whole system can be reduced.

A flat surface is apt to become concave in a center in polishing. Since reflection of a front side of a polished surface and reflection of a back side are combined, the former is reflection of a concave surface, the latter is the same of a convex surface, the astigmatism generated by one reflection is counterbalanced by the other reflection. For example, if the mirror 15 is disposed as a front surface reflection mirror as shown in FIG. 14, and a rectangular prism is disposed in place of the mirror 22 in such a manner as that the prism reflects a light beam from a rear surface, the wave front aberration due to the shape of the mirror surface can be reduced. The double headed arrows in FIGS. 12 and 14 represent directions of strain of the mirror.

Figure 15:
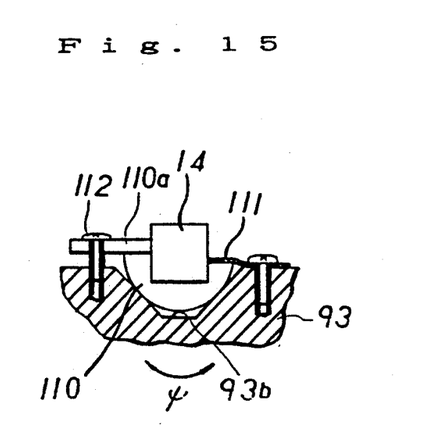
FIG. 15 is a sectional view of a holding mechanism which holds a prism.

FIG. 15 shows the support construction for the anamorphic prism 13 or 14. The prism 14 is attached to semi-cylindrical holder 110 that is mounted in groove 93b formed on Y-shaped base 93. One side of the holder 110 is resiliently fixed with plate spring 111, the other side is fixed to the base 93 with plate 110a that is fixed with screw 112. Since the screw 112 is driven, the holder 110 pivots along the groove 93b, the prism 14 pivots about optical axis in direction $\phi$. And also, since distance between the semiconductor laser 11 and the collimator lens 12 is adjusted, astigmatism can be corrected.

Next, the construction to reduce the wave front aberration of the lens system is explained.

In general, the objective lens 21 is apt to generate larger astigmatism than the another optical elements, since the astigmatism direction of the objective lens is only adjusted, astigmatism that is generated with another optical elements can be counterbalanced by the astigmatism of the objective lens and wave front aberration of the whole optical system can be reduced. The objective lens 21 is pivoted for adjustment during assembly of each optical element so that the F/T cross talk becomes smallest when the spot on the optical disk moves across a track.

Astigmatisms of the objective lens 21 and the collimator lens 12, which is liable to have large astigmatism next to the objective lens, are measured and the lenses are marked with M which indicates the direction of the astigmatism before assembly. Each lens is assembled so that these marks are positioned in orthogonal direction to each other as shown in FIG. 6. Since the relationship between the objective lens 21 and the collimator lens 12 is adjusted, wave front aberration of whole system can be substantially reduced.

The optical system of the optical disk apparatus according to the present invention can correct wave front aberration which is generated with the whole optical system on the optical disk.

In particular, since the wave front aberration AS2 is corrected, the F/T cross talk is reduced and an focus servo becomes accurate, even when focus error is detected by the astigmatism method.

What is claimed is:

1. An optical system of an optical disk apparatus comprising:
    a light source;
    a converging lens for converging a light beam emitted from said light source onto an optical disk; and
    an aberration correcting element for setting off wave front aberration so that astigmatism of said light beam at said optical disk is corrected, said aberration correcting element being disposed between said light source and said optical disk;

wherein said aberration correcting element includes strain to add wave front aberration to a light beam passing therethrough.

2. An optical system of an optical disk apparatus having plural optical elements, said optical disk apparatus comprising:

a light source for emitting a light beam;

an objective lens for converging said light beam onto an optical disk;

means for detecting a focus error signal by an astigmatism method;

means for driving said objective lens along the optical axis according to said focus error signal; and a wave front aberration correcting element for setting off wave front aberration so that astigmatism of said light beam at said optical disk is corrected, said aberration correcting element being disposed in a parallel light beam between said light source and said optical disk;

wherein said wave front aberration correcting element corrects the wave front aberration in a rotated coordinate system, the axes of which form angles of 45° with radial and tangential directions of the optical disk.

3. A method for setting off astigmatism of an optical system of an optical disk apparatus, said optical system including plural optical elements, said plural optical elements including a light source, a collimator lens, beam shaping prisms, a beam splitter, and an objective lens, said method comprising the steps of:

assembling said plural optical elements at predetermined positions;

determining the direction of astigmatism present in said plural optical elements; and adjusting at least one of said plural optical elements so that astigmatism of said plural optical elements are counterbalanced at least by one other optical element and astigmatism of a light beam at an optical disk is corrected.

4. An optical system of an optical disk apparatus comprising:

a light source;

a converging lens for converging a light beam emitted from said light source onto an optical disk; and an aberration correcting element for setting off wave front aberration so that astigmatism of said light beam at said optical disk is corrected, said aberration correcting element being disposed between said light source and said optical disk;

wherein said aberration correcting element corrects the wave front aberration in a rotated coordinate system, the axes of which form angles of 45° with radial and tangential directions of the optical disk.

* * * * *